United States Patent
Steffens et al.

(10) Patent No.: US 7,407,572 B2
(45) Date of Patent: Aug. 5, 2008

(54) FEED INJECTOR

(75) Inventors: Todd R. Steffens, Centreville, VA (US);
Thomas E. Hewitt, Alexandria, VA (US); Rathna P. Davuluri, Fairfax, VA (US); Enrique Feliz, Kingwood, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 323 days.

(21) Appl. No.: 11/145,102

(22) Filed: Jun. 3, 2005

(65) Prior Publication Data
US 2006/0016726 A1    Jan. 26, 2006

Related U.S. Application Data

(60) Provisional application No. 60/590,599, filed on Jul. 23, 2004.

(51) Int. Cl.
*C10G 11/00* (2006.01)
*B01J 8/08* (2006.01)

(52) U.S. Cl. ................... 208/113; 422/214

(58) Field of Classification Search ............... None
See application file for complete search history.

(56) References Cited

U.S. PATENT DOCUMENTS

| 4,981,368 | A | | 1/1991 | Smith | 366/337 |
| 5,794,857 | A | | 8/1998 | Chen et al. | 239/430 |
| 5,979,799 | A | * | 11/1999 | Chen et al. | 208/113 |
| 2002/0153428 | A1 | | 10/2002 | Koveal et al. | 239/11 |
| 2004/0062689 | A1 | | 4/2004 | Gauthier et al. | 422/139 |

FOREIGN PATENT DOCUMENTS

EP       0454416       10/1991
WO       WO 2005/047427   5/2005

* cited by examiner

*Primary Examiner*—Glenn Caldarola
*Assistant Examiner*—Randy Boyer
(74) *Attorney, Agent, or Firm*—Gerard J. Hughes; Bruce M. Bordelon

(57) ABSTRACT

This invention relates to an apparatus and process for atomizing a petroleum feed. More particularly, a liquid petroleum feed is atomized with an atomization apparatus in which the apparatus has an orifice that produces a generally flat spray pattern of finely dispersed feed prior to contacting catalyst in a fluid catalytic cracking zone. The orifice has a general aspect ratio greater than 1.0 and a ratio of perimeter length-to-cross-sectional area greater than 1.5 relative to a perimeter-to-cross-sectional area ratio of a circular orifice of equivalent area. The apparatus can be used to atomize feed injected into the cracking zone of a fluid catalytic cracker.

16 Claims, 5 Drawing Sheets

Top View

Front View

FEED INJECTOR

CROSS-REFERENCE TO RELATED APPLICATION

This application claims benefit of U.S. Provisional Patent Application Ser. No. 60/590,599 filed Jul. 23, 2004.

FIELD OF THE INVENTION

This invention relates to an apparatus for atomizing a petroleum feed. More particularly, a liquid petroleum feed is atomized with an atomization apparatus in which the apparatus has an orifice that produces a generally flat spray pattern of finely dispersed feed prior to contacting catalyst in a fluid catalytic cracking zone.

BACKGROUND OF THE INVENTION

The fluidization of petroleum feeds is important to petroleum processes such as fluidized catalytic cracking (FCC) and coking. In the FCC process, high molecular weight feeds are contacted with fluidized catalyst particles in the riser reactor part of the FCC unit. The contacting between feed and catalyst is controlled according to the type of product desired. In the catalytic cracking of the feed, reactor conditions such as temperature and contact time are controlled to maximize the products desired and minimize the formation of less desirable products such as light gases and coke.

Since the contacting between catalyst and feed in the FCC reactor is typically in the order of a few seconds, an important factor governing the efficiency of the cracking process is the catalyst. Catalyst for the FCC process is well known and may be either amorphous or crystalline. Catalyst entering the FCC reactor is typically fluidized using steam, hydrocarbon gases generated during the cracking process or some combination thereof. The reaction of catalyst and feed generates large volumes of gaseous hydrocarbons and spent catalyst bearing coke deposits. The gas/solid mixture is passed to separators, typically cyclones, where spent catalyst is separated from gases. Gases are then processed to recover desired hydrocarbons and spent catalyst sent for regeneration.

Because of the short contacting time between feed and catalyst, the condition of the feed is also important. The type of feed injection can have an impact on the product slate produced by the FCC reactor. There are two pathways for the feed to crack into gaseous hydrocarbons, i.e., catalytic and thermal. Thermal cracking in a FCC unit is generally undesirable as this type cracking can result in the generation of light gases such as methane in addition to coke. In order to improve the efficiency of the catalytic cracking process, it is generally desirable to have the feed dispersed into fine droplets as a non-dispersed liquid feed in contact with hot catalyst particles favors thermal cracking.

One method of achieving droplets of feed involves the use of steam to form a dispersion of droplets. The resulting dispersion is a two-phase system of water and hydrocarbon that is sprayed through nozzle(s) into the FCC riser reactor where it contacts fluidized hot catalyst. The process of forcing a fluid under pressure through the orifice of a nozzle to form a fine dispersion of fluid droplets is known as atomization. The degree of atomization is a function of nozzle design, orifice size, fluid density, fluid viscosity, surface tension and pressure drop across the orifice. Generally, using a nozzle with a smaller orifice favors decreasing droplet size. Increasing the degree of atomization for heavy (viscous) petroleum fractions which form at least a part of the feed to the FCC process is especially challenging.

There have been numerous designs of nozzles for feed atomization in the FCC reactor. Some proposed nozzle designs utilize swirl vanes, either in the nozzle itself or the conduit leading to the nozzle. Another proposed design uses a Venturi in the conduit feeding the nozzle. Other proposed designs include feeding hydrocarbon and feed concentrically through the nozzle, a hydrocarbon feed distributor feeding hydrocarbon through concentric nozzles located in the center of the FCC reactor, injecting feed through a plurality of orifices within the nozzle and the use of shrouds around the nozzles, and controlling the angle at which the steam and hydrocarbon contact one another. It has also been proposed to form a two-phase fluid mixture of feed and steam, dividing the fluid into two separate streams which are passed through an impingement mixing zone, a shear mixing zone to recombine the separate streams and a low pressure atomization zone. A further proposed design is a nozzle in which misting of a single feed stream may be accomplished by passing the full liquid stream, with or without included steam, through deflection vanes to create a free vortex in a single full-flow centrifugal or helical acceleration chamber which terminates in a sharp or square-edged orifice. Such orifice is substantially smaller in diameter than the fluid supply line for feeding the liquid hydrocarbons directly into the catalyst flow stream in the riser reactor. Finally, a feed injector that is generally fan-shaped has been proposed for producing a substantially flat spray pattern of atomized feed.

There is still a need for improved performance of feed injection nozzles to create improvements in the atomization process of feeds in the FCC process.

SUMMARY OF THE INVENTION

This invention is directed to an apparatus for atomizing and dispersing a petroleum feed to a FCC reactor. In one embodiment, the invention relates to an apparatus for atomizing a petroleum feed comprising: a conduit containing at least one inlet, at least one outlet and a passageway within said conduit connecting the inlet with the outlet, said passageway containing an orifice wherein the orifice has a general aspect ratio greater than 1.0 and a ratio of perimeter length-to-cross-sectional area greater than 1.5 relative to a perimeter-to-cross-sectional area ratio of a circular orifice of equivalent area. The spray pattern produced by the feed passing through the orifice is substantially flat and fan-shaped.

In a related embodiment of the invention, the orifice is elliptical or rectangular in shape and the elliptical or rectangular shape includes at least one member protruding inwardly from the elliptical or rectangular shape. In a preferred embodiment, the inwardly protruding member comprises at least one pointed, square-edged or rounded member.

In another embodiment, the invention comprises a process for injecting a petroleum feed into a reaction zone of a fluid catalytic cracking reactor which comprises: injecting the feed into the reaction zone through a feed injector for atomizing the feed, said injector comprising a conduit containing at least one inlet, at least one outlet and at least one orifice, said orifice having a general aspect ratio greater than 1.0 and having a ratio of perimeter length-to-cross-sectional area greater than 1.5 relative to the perimeter-to-cross-sectional area ratio of a circular orifice of equivalent area. The feed injector results in a spray pattern of atomized particles that is generally flat.

DETAILED DESCRIPTION

Figure 1:
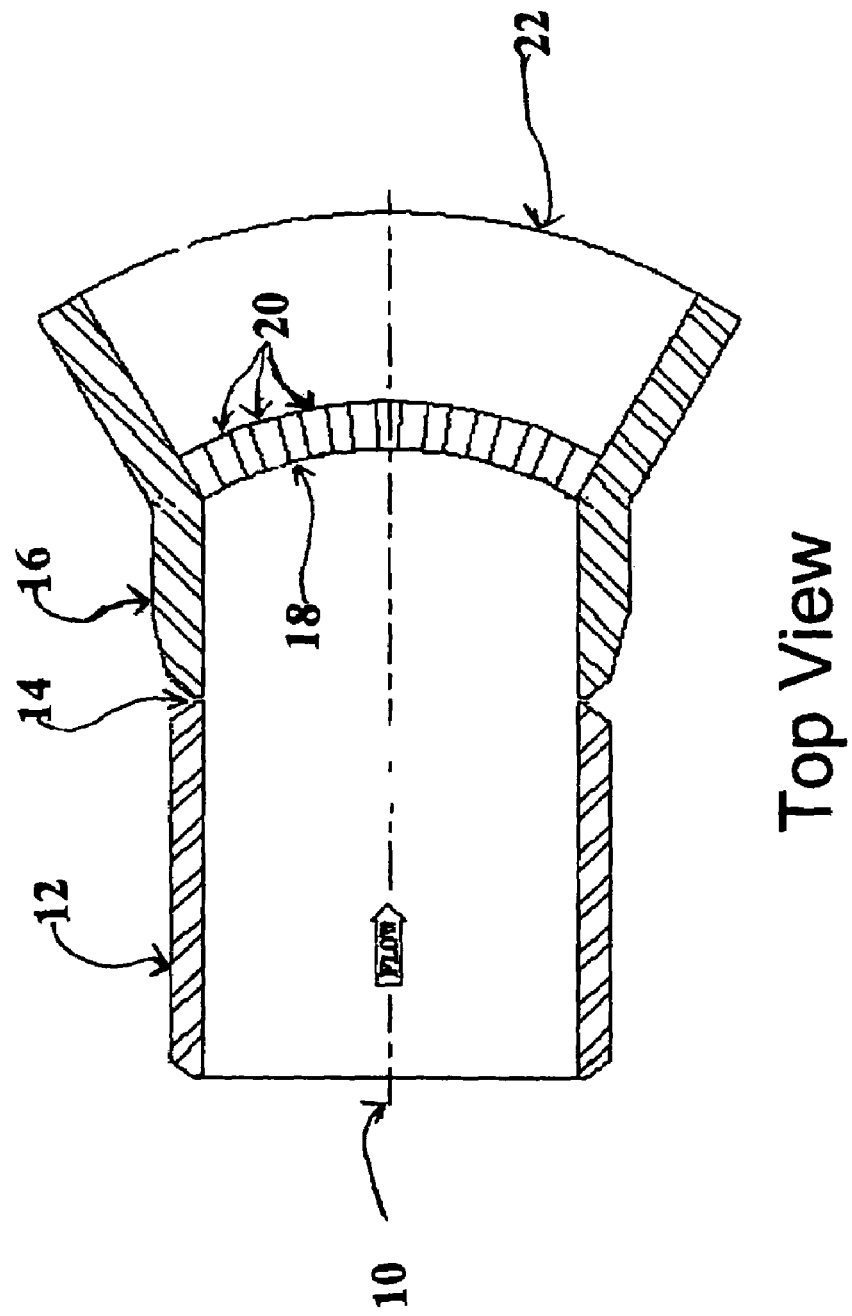
FIG. 1 is a schematic diagram of a top view of the injector in plan view.

A conventional FCC process includes a riser reactor and a regenerator wherein petroleum feed is injected into the reaction zone of a riser reactor containing a bed of fluidized cracking catalyst particles. The catalyst particles typically contain zeolites and may be fresh catalyst particles, catalyst particles from a catalyst regenerator, or some combination thereof. Gases that may be inert gases, hydrocarbon vapors, steam, or some combination thereof, are normally employed as lift gases to assist in fluidizing the hot catalyst particles.

Catalyst particles that have contacted feed produce product vapors and catalyst particles containing strippable hydrocarbons as well as coke. The catalysts exit the reaction zone as spent catalyst particles and are separated from the reactor's effluent in a separation zone. The separation zone for separating spent catalyst particles from reactor effluent may employ separation devices such as cyclones. Spent catalyst particles are stripped of strippable hydrocarbons using a stripping agent such as steam. The stripped catalyst particles are then sent to a regeneration zone in which any remaining hydrocarbons are stripped and coke is removed. In the regeneration zone, coked catalyst particles are contacted with an oxidizing medium, usually air, and coke is oxidized (burned) at high temperatures such as 510 to 760° C. The regenerated catalyst particles are then passed back to the riser reactor.

Suitable hydrocarbon feedstocks for the catalytic cracking process described herein include natural and synthetic hydrocarbonaceous oils boiling in the range of about 221° C. (430° F.) to about 566° C. (1050° F.), such as gas oil; heavy hydrocarbonaceous oils comprising materials boiling above 1050° F.; heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, naphtha, and mixtures thereof.

FCC catalysts may be amorphous, e.g., silica-alumina and/or crystalline, e.g., molecular sieves including zeolites or mixtures thereof A preferred catalyst particle comprises (a) an amorphous, porous solid acid matrix, such as alumina, silica-alumina, silica-magnesia, silica-zirconia, silica-thoria, silica-beryllia, silica-titania, silica-alumina-rare earth and the like; and (b) a zeolite such as faujasite. The matrix can comprise ternary compositions such as silica-alumina-thoria, silica-alumina-zirconia, magnesia and silica-magnesia-zirconia. The matrix may also be in the form of a cogel. Silica-alumina is particularly preferred for the matrix, and can contain about 10 to 40 wt. % alumina. As discussed, promoters can be added.

The catalyst's zeolite includes zeolites which are iso-structural to zeolite Y. These include the ion-exchanged forms such as the rare-earth hydrogen and ultrastable (USY) form. The zeolite may range in crystallite size from about 0.1 to 10 microns, preferably from about 0.3 to 3 microns. The relative concentrations of zeolite component and matrix on an anhydrous basis may vary widely, with the zeolite content ranging from about 1 to 100, preferably 10 to 99, more usually from about 10 to 80, percent by weight of the dry composite.

The amount of zeolite component in the catalyst particle will generally range from about 1 to about 60 wt. %, preferably from about 5 to about 60 wt. %, and more preferably from about 10 to about 50 wt. %, based on the total weight of the catalyst. As discussed, the catalyst is typically in the form of a catalyst particle contained in a composite. When in the form of a particle, the catalyst particle size will range from about 10 to 300 microns in diameter, with an average particle diameter of about 60 microns. The surface area of the matrix material after artificial deactivation in steam at pressures higher than in commercial operations (i.e., at pressures of ca. 1 atmosphere) will be about $\leq 350$ m$^2$/g, preferably 50 to 200 m$^2$/g, more preferably from about 50 to 100 m$^2$/g. While the surface area of the catalysts will be dependent on such things as type and amount of zeolite and matrix components used, it will usually be less than about 500 m$^2$/g, preferably from about 50 to 300 m$^2$/g, more preferably from about 50 to 250 m$^2$/g, and most preferably from about 100 to 250 m$^2$/g.

FCC process conditions in the reactor's reaction zone include temperatures from about 450° C. to about 700° C., hydrocarbon partial pressures from about 10 to 40 psia (69 to 276 kPa), preferably from about 20 to 35 psia (138 to 241 kPa); and a catalyst to feed (wt/wt) ratio from about 3 to 100, where catalyst weight is total weight of the catalyst composite. The total pressure is from atmospheric to about 45 psig (411 kPa). Though not required, it is preferred that steam be concurrently introduced with the feedstock into the reaction zone, with the steam comprising up to about 50 wt. %, preferably about 2 to about 10 wt. % of the primary feed. Also, it is preferred that the feedstock's residence time in the reaction zone be less than about 20 seconds, preferably from about 0.1 to about 20 seconds, and more preferably from about 1 to about 5 seconds.

In order for feed to be converted to product in such short reactions times, it is important for the feed to be atomized into small particles. The efficiency of the cracking process for converting feed to product is a function of the physical properties of the feed (viscosity, density and the like), physical properties of the catalyst stream (nature and configuration of catalyst), feed particle size, particle distribution into the reaction zone, spray angles between feed particles and catalyst particles, process conditions including flow rates of gases and liquids and pressures, and injector design. Additional factors that influence injector design include liquid pressure drops across the injector orifice, relative velocity between feed and any gas added to aid atomization and ratio of gas to liquid. Thus the efficiency of the cracking process is dependent in part on the type and design of the feed injector. The injector should atomize and disperse feed particles as well as be durable, i.e., capable of extended periods of service without plugging or suffering undue mechanical wear, e.g., abrasion from contact with catalyst particles. In the FCC process, feed is injected into the fluidized stream of catalyst particles through at least one injector situated to allow efficient contact between feed particles and catalyst particles. In a preferred embodiment, multiple feed injectors are situated in a pattern surrounding the stream of fluidized catalyst particles.

The feed is normally pre-heated to temperatures of from 120 to 450° C. A gas or gases is preferably added to the feed to enhance the atomization process. Such gases include steam, nitrogen, hydrogen, FCC off-gas and lower molecular weight ($C_6$—) hydrocarbons, preferably steam. The ratio of steam to feed can influence the atomization process by controlling the density of the resulting feed/steam mixture. The amount of steam is generally in the range from about 0.1 to 5.0 wt. %, based on the weight of the feed/steam mixture.

The feed injector according to the invention includes a conduit containing at least one inlet, at least one outlet and at least one orifice, said orifice having a general aspect ratio greater than 1.0 and having a ratio of perimeter length-to-cross-sectional area greater than 1.5 relative to the perimeter-to-cross-sectional area ratio of a circular orifice of equivalent area. The inlet accepts feed and any atomizing enhancing gas. The feed or feed mixture passes through the inlet to a throat section that is connected to an orifice. Upon passing through the orifice, an unstable jet of liquid is formed which breaks up into droplets (is atomized) and exits the injector through an outlet.

The orifice contains a single opening having a general aspect ratio of greater than 1.0, preferably greater than 1.5, most preferably greater than 2.0. The general aspect ratio of the orifice is defined as the largest linear measurement across the orifice opening orthogonal to the flow into which the injection is occurring divided by the largest linear measurement across the orifice opening perpendicular to the orthogonal measurement and within the planar surface of the orifice. For example, a circle or square would have a general aspect ratio of 1. The orifice also has a perimeter length-to-cross-section area ratio greater than 1.5, preferably greater than 2.0, most preferably greater than 2.5 relative to the perimeter-to-area ratio of a circular orifice of equivalent area. The circular orifice of equivalent area is obtained by measuring the open flow area of the orifice, calculating the diameter of a circle having the same open area, and dividing the circumference of the circle of the resulting diameter by the area of the circle of resulting diameter. The resulting perimeter-to-area ratio constitutes a basis for comparison with orifices according to the invention.

The orifice shape according to the above-noted criteria does not include a circle or square. An orifice in the shape of a rectangle or ellipse could meet the criteria provided that the perimeter of rectangle or ellipse is irregular, i.e., is interrupted by at least one protrusion which can have a square edged, rectangular, pointed or rounded shape. A preferred embodiment is a rectangle or ellipse having more than one protrusion. An example would be a rectangle-shaped orifice wherein at least portion of at least one side of the orifice has a saw-toothed pattern in which the individual teeth can be pointed, rectangular, square or rounded. The same pattern could be applied to an ellipse. Other geometric shapes are within the scope of invention provided they meet above-noted criteria.

An embodiment of the present feed injector is shown in FIG. 1 which is a schematic diagram in plan view. A feed 10 is carried through conduit 12 to inlet 14 of feed injector 16. The feed may be a mixture of heated hydrocarbon and admixed gas such as steam as atomizing aid. The conduit 12 is typically a feed-carrying pipe which is welded or otherwise attached to feed injector 16 at injector inlet 14. Injector 16 contains an orifice 18. Orifice 18 is bounded by a plurality of rectangular projections 20. The profile of orifice 18 is shown as a convex curve whose curvature is similar to that of fan-shaped outlet 22. Outlet 22 is in the plane of the drawing. Feed entering inlet 14 contacts projections 20 where the feed is atomized and discharged as an atomized spray through fan-shaped outlet 22.

Figure 2:
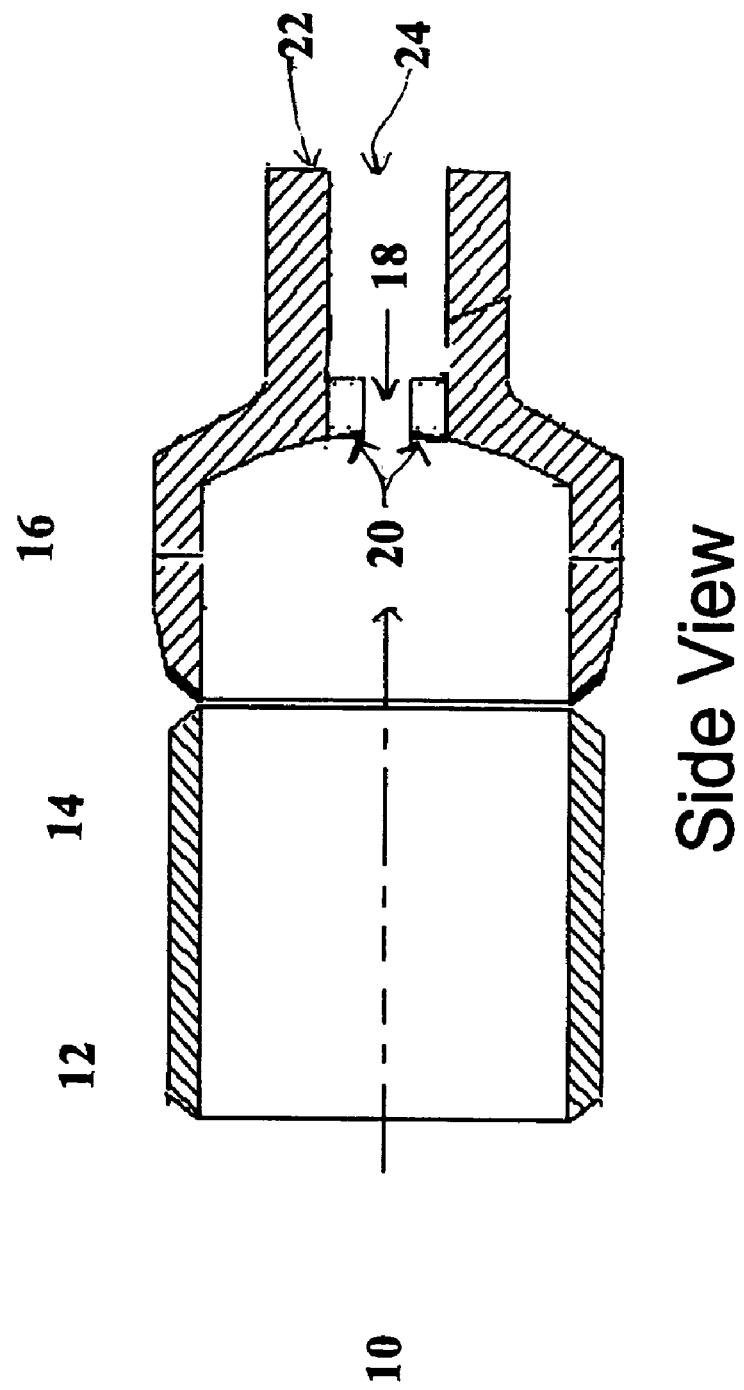
FIG. 2 is a schematic diagram of a side view of the injector in plan view.

FIG. 2 is a further schematic in plan view of a side view of the injector of FIG. 1. In the side view, the injector has been rotated 90° along an axis running through the center of the inlet and outlet. As in FIG. 1, a feed 10 is carried through conduit 12 to inlet 14 of feed injector 16. The conduit 12 is typically a feed-carrying pipe which is welded or otherwise attached to feed injector 16 at injector inlet 14. Injector 16 contains an orifice 18. Orifice 18 is the opening defined by the plurality of rectangular projections 20. Feed entering inlet 14 contacts projections 18 where the feed is atomized and discharged through the opening 24 in outlet 22 as an atomized spray.

Figure 3:
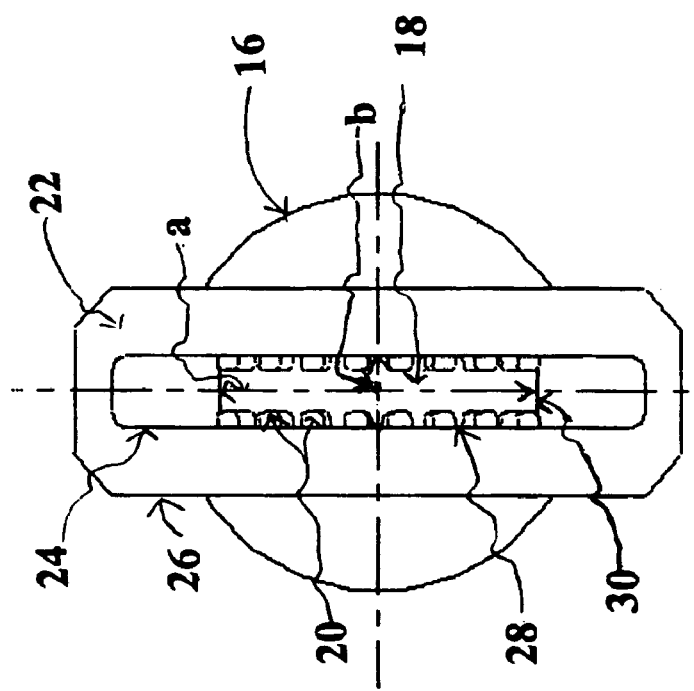
FIG. 3 is a schematic diagram of a front view of the injector in plan view.

FIG. 3 is a schematic diagram of a front view of feed injector 16. The outlet is shown as the rectangle shape 22 having an inner wall 24 and an outer wall 26. The orifice is shown as bounded by the rectangle having sides 28 and 30. Inside the boundaries of orifice 18 are a multiplicity of protrusions 20 having a rectangular shape and arranged along the two sides 28 in a saw-toothed pattern. The flow of feed is orthogonal (perpendicular) to the planar figure of the injector, i.e., the flow would be coming at right angles from below the plane of the paper and exiting at right angles above the plane of the paper. According to the definition set forth hereinbefore, the general aspect ratio of the orifice is defined as the largest linear measurement across the orifice opening orthogonal to the flow into which the injection is occurring divided by the largest linear measurement across the orifice opening perpendicular to the orthogonal measurement and within the planar surface of the orifice. In the context of FIG. 3, the ratio of dotted line a to dotted line b (a:b) is greater than 1. If hypothetically the ratio were 1, then orifice 18 would be in the form of a square instead of the rectangle of FIG. 3. The perimeter length-to-cross-sectional area is determined by calculating the area bounded by the protrusions 20 which corresponds to the open flow area of the orifice 18. The diameter of a circle having the same open area can be determined since the area of a circle is equal to $\pi r^2$. The circumference of the circle is equal to $\pi D$. The perimeter-to-area ratio is then obtained by dividing the circumference by the area.

Figure 4:
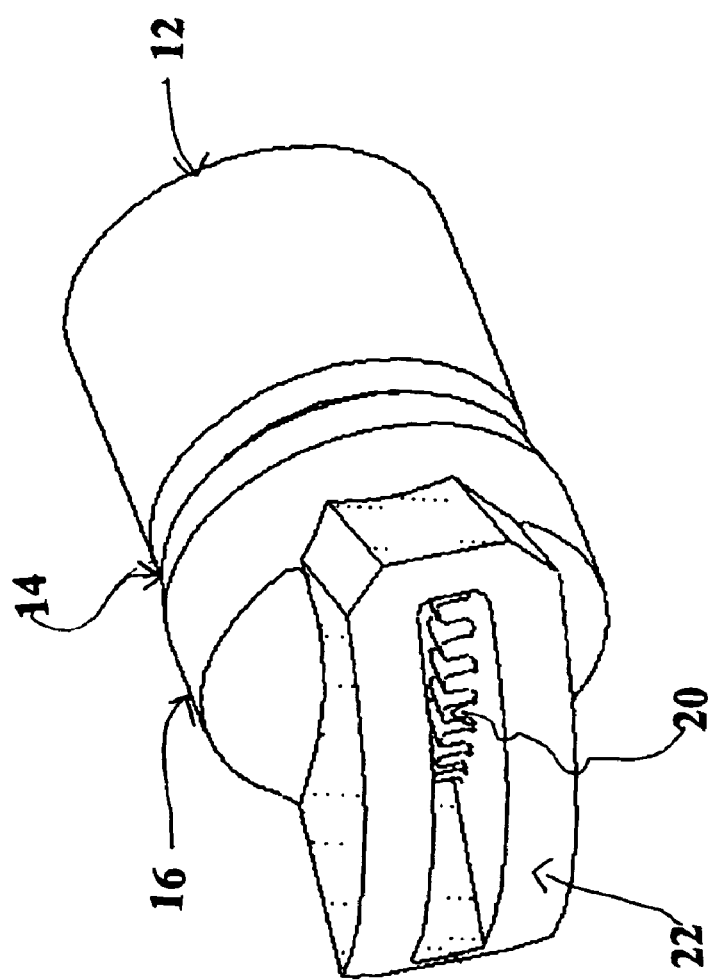
FIG. 4 is a schematic diagram of the injector in profile.

FIG. 4 is a schematic view of the injector in profile. In FIG. 4, feed-carrying conduit 12 is attached to injector 16 at 14. Projections 20 are within outlet 22 but are recessed below the surface of outlet 22. The depth relation between projections 20 and outlet 22 are also shown in FIG. 1.

The present feed injector or injectors are situated on the wall of the riser reactor. The feed injector or injectors are attached to the wall of the riser reactor such that the spray pattern of atomized feed from the injector(s) contact the fluidized catalyst particles flowing through the reaction zone of the riser reactor. The injector(s) are attached to the conduit carrying feed to the riser reactor. It is preferred that multiple feed injectors be employed to increase efficiency of feed distribution to flowing catalyst particles. Such multiple feed injectors are normally employed in a ring around the riser reactor, preferably in a symmetric radial design to provide an optimal spray pattern of feed particles across the catalyst particles. In an embodiment, the injectors are attached to an annular oil ring or manifold surrounding the flow of catalyst particles in the riser reactor.

The injectors may be attached to the wall of the riser reactor or to the annular manifold such that the angle between the injector and the wall may range from 0° to 90°. The riser reactor may be in a vertical position at the point of feed injection, or the wall at the point of injection may deviate from vertical. If desired, more than one ring at different levels may be employed. The riser reactor may also contain a refractory lining through which the injector passes.

It is preferred that the projection of the outlet of the feed injector into the flowing stream of catalyst particles in the riser be minimal so that erosion of the outlet is minimized and that disturbance of the catalyst stream is likewise minimized.

The following example is presented to illustrate the invention and should not be considered limiting in any way.

EXAMPLE

Figure 5:
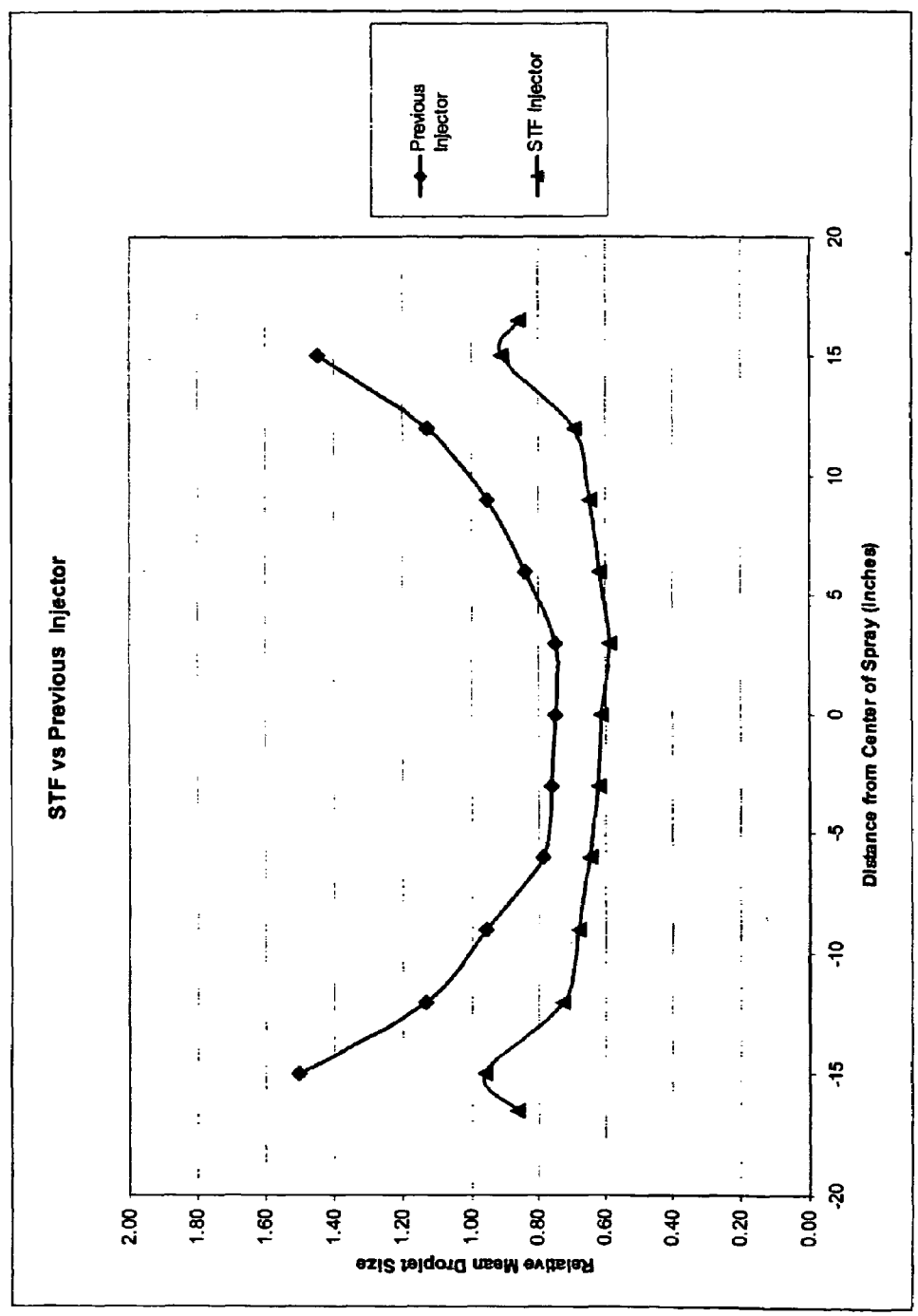
FIG. 5 is a graph showing a comparison of relative droplet size as a function of injector design.

In this example, an air/water feed was injected through the injector shown in FIG. 4. The same feed was injected through a comparative injector which is identical to the injector shown in FIG. 4 except that comparative injector is in the form of a simple rectangle without the saw-toothed pattern of protrusions shown in FIG. 4. The feed was injected through both injectors at comparable conditions (same temperature, pressure and feed rate) so that the only variable was the configuration of the injector itself. The injector shown in FIG. 4 and the comparative injector had a general aspect ratio of 3.2 and 3.6 and a ratio of perimeter length-to cross-sectional area of 2.0 and 1.4 respectively. The relative droplet size produced from the fan shape spray pattern produced by the respective injectors was measured as a function of the distance from the center of the spray pattern. The results are shown in FIG. 5 in which the present invention is designated as the STF Injector. As can be seen from FIG. 5, the relative droplet size from the injector according to the invention is both smaller and more uniform in size as compared to an injector without the saw-tooth pattern.

The invention claimed is:

1. A feed injector for atomizing a petroleum feed comprising: a conduit containing at least one inlet, at least one outlet and a passageway within said conduit connecting the inlet with the outlet, said passageway containing an orifice wherein the orifice has a general aspect ratio greater than 1.0 and a ratio of perimeter length-to-cross-sectional area greater than 1.5 relative to a perimeter-to-cross-sectional area ratio of a circular orifice of equivalent area, and the orifice includes at least one member protruding inwardly from the perimeter of the orifice.

2. The apparatus of claim 1 wherein the orifice is elliptical or rectangular in shape.

3. The apparatus of claim 1 or 2 wherein the at least one inwardly protruding member comprises at least one pointed, square-edged or rounded member.

4. The apparatus of claim 3 wherein the at least one inwardly protruding member is square-edged.

5. The apparatus of claim 2 wherein the orifice is rectangular in shape.

6. The apparatus of claim 5 wherein the orifice contains a plurality of square-edged protrusions protruding inwardly from the rectangular shape.

7. The apparatus of claim 1 wherein the orifice produces a fan-shaped spray pattern.

8. The apparatus of claim 1 wherein the general aspect ratio is greater than 1.5.

9. The apparatus of claim 1 wherein the ratio of perimeter length-to-cross-sectional area is greater than 2.0.

10. A process for injecting a petroleum feed into a reaction zone of a fluid catalytic cracking reactor which comprises: injecting the feed into the reaction zone through a feed injector for atomizing the feed, said injector comprising a conduit containing at least one inlet, at least one outlet and a passageway within said conduit connecting the inlet with the outlet, said passageway containing an orifice wherein the orifice has a general aspect ratio greater than 1.0 and a ratio of perimeter length-to-cross-sectional area greater than 1.5 relative to a perimeter-to-cross-sectional area ratio of a circular artifice of equivalent area, and the orifice includes at least one member protruding inwardly from the perimeter of the orifice.

11. The process of claim 10 wherein the orifice is elliptical or rectangular in shape.

12. The process of claim 10 or 11 wherein the at least one inwardly protruding member comprises at least one pointed, square-edged or rounded member.

13. The process of claim 12 wherein the at least one inwardly protruding member is square-edged.

14. The process of claim 10 wherein the orifice produces a fan-shaped spray pattern.

15. The process of claim 10 wherein the general aspect ratio is greater than 1.5.

16. The process of claim 10 wherein the ratio of perimeter length-to-cross-sectional area is greater than 2.0.

* * * * *